United States Patent
Gates et al.

(10) Patent No.: US 6,415,776 B1
(45) Date of Patent: Jul. 9, 2002

(54) EGR SYSTEM USING PRESSURE-BASED FEEDBACK CONTROL

(75) Inventors: Freeman Carter Gates, Bloomfield; Douglas Raymond Martin, Plymouth, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 47 days.

(21) Appl. No.: 09/648,442

(22) Filed: Aug. 25, 2000

(51) Int. Cl.⁷ .............................................. F02M 25/07
(52) U.S. Cl. .............................. 123/568.24; 123/568.26
(58) Field of Search ........................ 123/568.23, 568.24, 123/568.26, 568.16, 568.21, 568.22, 568.25, 568.27, 568.29

(56) References Cited

U.S. PATENT DOCUMENTS

| | | | | |
|---|---|---|---|---|
| 4,432,331 A | * | 2/1984 | Yasuhara | 123/568.16 |
| 4,433,666 A | * | 2/1984 | Masaki et al. | 123/568.22 |
| 4,690,120 A | | 9/1987 | Egle | |
| 4,782,810 A | * | 11/1988 | Shimoda et al. | 123/568.16 |
| 5,152,273 A | * | 10/1992 | Ohuchi | 123/568.16 |
| 5,273,019 A | | 12/1993 | Matthews | |
| 5,503,131 A | * | 4/1996 | Ohuchi | 123/568.24 |
| 5,791,319 A | | 8/1998 | Friedrich | |
| 5,832,896 A | | 11/1998 | Phipps | |
| 5,970,961 A | * | 10/1999 | Kotwicki et al. | 123/568.27 |
| 6,012,437 A | | 1/2000 | Radhamohan | |
| 6,076,502 A | * | 6/2000 | Katashiba et al. | 123/435 |
| 6,098,602 A | * | 8/2000 | Martin et al. | 123/568.23 |
| 6,182,644 B1 | * | 2/2001 | Kotwicki et al. | 123/568.16 |
| 6,182,645 B1 | * | 2/2001 | Tsuchiya | 123/568.23 |
| 6,257,214 B1 | * | 7/2001 | Bidner et al. | 123/568.16 |

FOREIGN PATENT DOCUMENTS

| | | | | |
|---|---|---|---|---|
| JP | 161161 | * | 6/1990 | F02M/25/07 |
| JP | 18323 | * | 1/1993 | F02M/25/07 |

* cited by examiner

*Primary Examiner*—Terry M. Argenbright
*Assistant Examiner*—Hai Huynh
(74) *Attorney, Agent, or Firm*—Carlos Hanze

(57) ABSTRACT

An EGR system using pressure-based feedback control includes an actuator for moving an EGR valve between a closed position and an open position, and a position sensor for detecting the position of the EGR valve and generating a position output signal. A processing circuit receives the position output signal and transmits electrical control signals to energize the actuator and move the EGR valve. A controller includes control logic operative to determine the position for the EGR valve using open loop control during transient behavior and closed loop control for steady state accuracy.

15 Claims, 2 Drawing Sheets

EGR SYSTEM USING PRESSURE-BASED FEEDBACK CONTROL

TECHNICAL FIELD

The present invention relates to an exhaust gas recirculation system for controlling the flow of exhaust gas from an exhaust gas passage to an engine intake passage of an internal combustion engine. More particularly, the present invention relates to an exhaust gas recirculation system using pressure-based feedback control.

BACKGROUND ART

Exhaust gas recirculation (EGR) systems are employed in automotive vehicles in order to help reduce various engine emissions. Such systems typically employ an EGR valve that is disposed between the engine exhaust manifold and the engine intake manifold, and operable, when in an open position, to recirculate a portion of the exhaust gases from the exhaust side of the engine back to the intake side.

An actuator is employed for moving the EGR valve between its open and closed positions, with the recirculation of exhaust gas being more appropriate at certain times. Typically, the appropriate time for recirculation is when the vehicle is traveling at lower speeds, when the pressure at the intake side of the engine is less than the pressure at the exhaust side of the engine.

Many prior art EGR systems employ air pressure as an actuator. However, in order to achieve more precise control, electrically-actuated EGR valves have also been introduced. Electrically-actuated EGR valve systems may employ software-implemented control logic which implements open or closed loop control. Such control logic controls current to an electric actuator motor which, in turn, positions the EGR valve. In such systems, the control logic may generate pulse width modulated (PWM) signals to power the actuator motor, and modulate the acceleration and deceleration of the EGR valve as it moves to its desired positions.

The open loop system is generally faster and less expensive than a closed loop system, but requires a separate device to diagnose failure. This other device is usually a manifold absolute pressure (MAP) sensor. The cost of the MAP sensor offsets much of the cost benefit of the open loop system. Open loop EGR systems typically use a stepper motor valve which reliably moves the valve to a requested position. Flow through the valve is inferred by knowing the pressure before and after the valve in concert with its position. Unfortunately, open loop flow prediction degrades rapidly as particulates clog the valve, and requires the valve itself to have minimal variability in its manufactured flow characteristics.

Closed loop systems measure flow using pressures before and after a control orifice, which is located within the EGR flow path. The measured flow is compared to the requested flow. The valve is then moved to minimize flow error. This process has improved steady state performance in terms of the actual flow matching the requested flow, regardless of how degraded or variable the valve flow characteristic may be. However, this system is slower in reaching its final position. Furthermore, if used too aggressively to minimize the time response, closed loop systems can be unstable.

With the advent of more aggressive nitrous oxide emission standards, federal legislation requires that a malfunction indicator light be activated when the tailpipe nitrous oxide level exceeds 1.5 times the legislated standard. Unfortunately, prior art systems have experienced difficulty in providing this feature. Because of the low signal to noise ratio when comparing EGR % to manifold absolute pressure, prior art system can not meet these requirements.

The disadvantages associated with these conventional EGR system control techniques have made it apparent that a new technique for EGR system control is needed. The new technique should not degrade over time or require minimum variability in existing EGR valves. Additionally, the new technique should have a minimum response time without stability problems. The present invention is directed to these ends.

SUMMARY OF THE INVENTION

It is, therefore, an object of the present invention to provide an improved and reliable EGR system using pressure-based feedback control. Another object of the present invention is to prevent system degradation due to EGR valve conditions. An additional object of the present invention is to have low response time without going unstable.

In accordance with the objects of this invention, an EGR system using pressure-based feedback control is provided. In one embodiment of the invention, an EGR system using pressure-based feedback control includes an actuator for moving an EGR valve between a closed position and an open position, and a position sensor for detecting the position of the EGR valve and generating a position output signal. A processing circuit receives the position output signal and transmits electrical control signals to energize the actuator and move the EGR valve. A controller includes control logic operative to determine the position for the EGR valve using open loop control during transient behavior and closed loop control for steady state accuracy.

The present invention thus achieves an improved EGR system using pressure-based feedback control. The present invention is advantageous in that the system has a response time equivalent to an open loop system while maintaining steady state performance. Additionally, the present invention provides hardware and software to more robustly measure the pressure drop across an orifice in the EGR flow stream.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF THE DRAWINGS

In order that the invention may be well understood, there will now be described some embodiments thereof, given by way of example, reference being made to the accompanying drawings, in which.

BEST MODES FOR CARRYING OUT THE INVENTION

Figure 1:
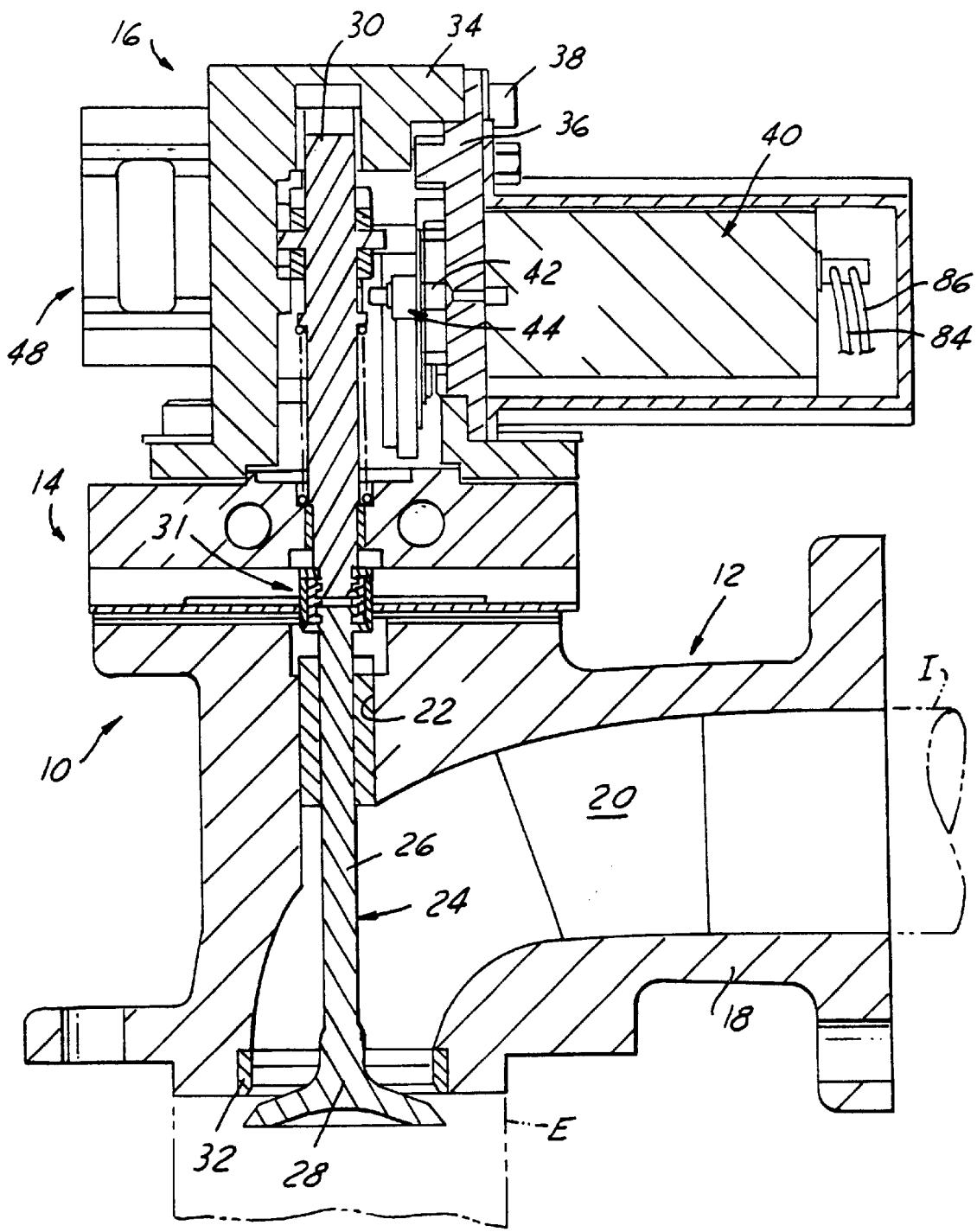
FIG. 1 is a transverse cross section of an exhaust gas recirculation valve using pressure-based feedback control in accordance with one embodiment of the present invention.

In the following figures, the same reference numerals will be used to identify identical components in the various views. The present invention is illustrated with respect to an exhaust gas recirculation (EGR) system using pressure-based feedback control, particularly suited for the automotive field. However, the present invention is applicable to various other uses that may require EGR system using pressure-based feedback controls.

Referring to FIG. 1, a transverse cross section of an exhaust gas recirculation system 10 using pressure-based feedback control in accordance with one embodiment of the present invention is illustrated. EGR system 10 includes a manifold portion 12, a heat transfer (cooling) portion 14, and an actuator portion 16.

Manifold portion 12 includes a manifold housing 18 that defines a passage 20. At the upstream end of passage 20, manifold portion 12 is connected to an exhaust passage E, and, at the downstream end of passage 20, manifold portion 12 is connected to an intake passage I. Manifold housing 18 also defines a bore 22 within which a valve assembly, generally designated 24, is reciprocally supported for axial movement therein. Valve assembly 24 includes a valve stem 26 that is integrally formed with a poppet valve 28, and an input stem portion 30 that is coupled to valve stem 26 via a coupling arrangement 31 such that input stem portion 30 and valve stem 26 have common axial movement. Manifold housing 18 includes a valve seat 32 against which poppet valve 28 seats when valve assembly 24 is closed, such that valve seat 32 serves as the "close stop". However, in FIG. 1, valve assembly 24 is shown in an open position.

Actuator portion 16 includes an actuator housing 34 to which is attached a housing cover 36 by means of bolts 38 or any other suitable means. Attached to the exterior of housing cover 36 is the casing of an electric motor, generally designated 40. Although the particular construction and specifications of electric motor 40 are not essential to the present invention, motor 40 preferably is of the relatively high speed, continuously rotating type, and one with a high torque-to-inertia ratio, such as a permanent magnet DC commutator motor. As is described in greater detail below, control logic controls the functioning of electric motor 40 via electrical connections 84 and 86.

Electric motor 40 of actuator 16 provides a low torque, high speed rotary output at a motor output shaft 42 which drives a gear train generally designated 44. Gear train 44 translates the relatively low torque, high-speed rotary output of motor 40 into a relatively high torque, low speed rotary output. The output of gear train 44 is then converted via linkage means, generally designated 46, into axial movement of input stem portion 30 and of the entire valve assembly 24.

Attached to actuator housing 34 is a sensor assembly, generally designated 48, the function of which is to sense the axial position of valve assembly 24. In a manner known to one of ordinary skill in the art, position sensor 48 actually senses the angular position of a shaft which is representative of the angular position of a gear of gear train 44 which, in turn, is representative of the axial position of valve assembly 24 (and, thus, poppet valve 28). Sensor 48 converts the sensed position into an appropriate electrical signal that is transmitted as an input to control logic (described below) that controls the functioning of electric motor 40. In the preferred embodiment, sensor 48 is a resistive position sensor of the type typically used in the automotive industry for throttle position measurements.

Figure 2:
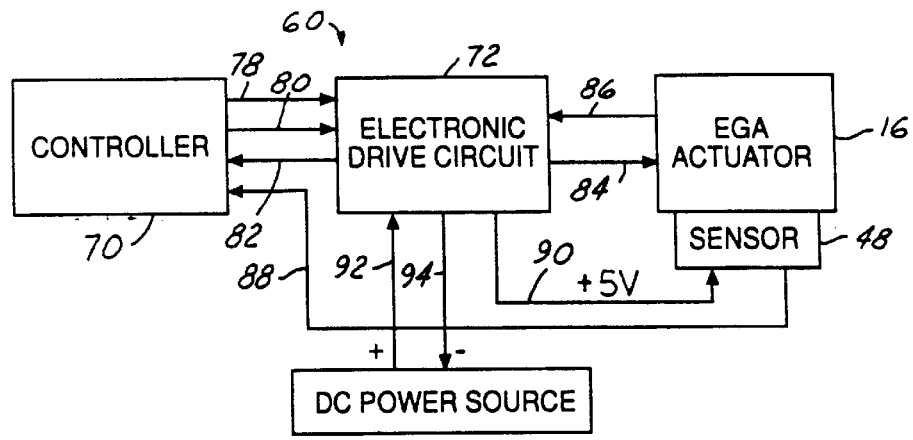
FIG. 2 is an electrical block diagram of an EGR system using pressure-based feedback control in accordance with one embodiment of the present invention.

Referring to FIG. 2, an electrical block diagram of an EGR system 10 using pressure-based feedback control 60 in accordance with one embodiment of the present invention is illustrated. Feedback control 60 includes a controller 70, a drive circuit 72, actuator 16 (that includes electric motor 40), and sensor 48. In the preferred embodiment, controller 70 is a robust microprocessor-based controller. Control logic for controller 70 controls the functioning of electric motor 40, and is described in greater detail below. Controller 70 and drive circuit 72 are electrically coupled via electrical connections 78, 80 and 82.

Controller 70 provides a motor-actuating signal and a direction signal to drive circuit 72 via electrical connections 78 and 80, respectively. In the preferred embodiment, the motor-actuating signal is a PWM (Pulse Width Modulated) signal, the details of which are known to one of ordinary skill in the art, although other types of signals, such as analog signals, may be used. The direction signal indicates whether valve assembly 24 should be moved toward a closed position or an open position, with either a clockwise or counter-clockwise rotation of motor 40 providing the appropriate axial movement thereof.

Drive circuit 72 provides a current feedback signal to controller 70 via electrical connection 82. By means of this feedback signal, controller 70 can detect if overcurrent conditions are ever present in motor 40 so that power thereto can be discontinued. Controller 70 receives a position signal via electrical connection 88 from sensor 48 that is indicative of the axial position of the valve assembly 24. In the preferred embodiment, controller 70 and drive circuit 72 are located within the engine compartment of the vehicle in close proximity to the EGR valve system 10.

Drive circuit 72 receives inputs from controller 70 via electrical connections 78 and 80 and, in response thereto, drives motor 40 of actuator 16. Operating as a "power amplifier" with respect to the PWM signal of the preferred embodiment, drive circuit 72 supplies a bi-directional current to motor 40 via electrical connections 84 and 86. Drive circuit 72 receives power from power source 76 via electrical connections 92 and 94, and supplies +5 volt regulated DC operating voltage to position sensor 48 via electrical connection 90. A variety of satisfactory drive circuits are well known to those skilled in the art.

Figure 3:
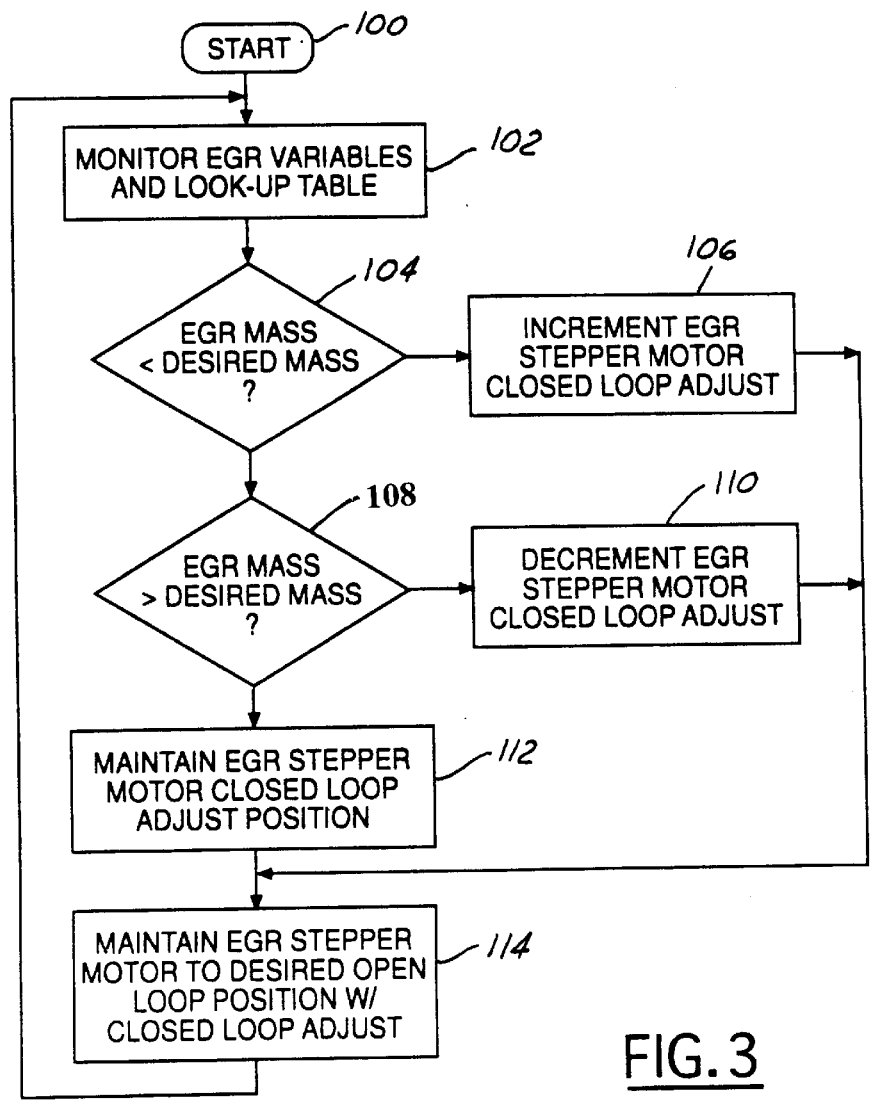
FIG. 3 is a flow chart depicting a method for an EGR system using pressure-based feedback control in accordance with one embodiment of the present invention.

Referring to FIG. 3 a flow chart depicting a method for an EGR system using pressure-based feedback control in accordance with one embodiment of the present invention is illustrated. This method is implemented using control logic in controller 70 and, through electrical connections 84 and 86, controls motor 40 and, thus, the position of valve assembly 24. The sequence begins at step 100 and proceeds, after any number of standard start-up operations, to step 102. In step 102, controller 70 monitors various EGR variables and look-up table values. Primarily, controller 70 monitors engine speed and pressure within the EGR flow path. The sequence then proceeds to step 104.

In step 104, controller 70 compares measured EGR mass to desired EGR mass. Controller 70 infers actual EGR mass from the pressure differential before and after a control orifice. Desired EGR mass is predetermined by extensive testing and is stored in a look-up table in controller 70. If the measured EGR mass is less than the desired EGR mass minus some small amount of error, then the sequence proceeds to step 106. In step 106, controller 70 increments an EGR stepper motor dosed loop adjust variable and the sequence proceeds to step 114. If the measured EGR mass is not less than the desired EGR mass minus some small amount of error, then the sequence proceeds to step 108.

In step 108, controller 70 again compares measured EGR mass to desired EGR mass. If the measured EGR mass is greater than the desired EGR mass plus some small amount of error, then the sequence proceeds to step 110. In step 110, controller 70 decrements the EGR stepper motor closed loop adjust variable and the sequence proceeds to step 114. If the measured EGR mass is not greater than the desired EGR mass plus some small amount of error, then the sequence proceeds to step 112. In step 112, controller 70 sets the EGR stepper motor closed loop adjust variable to zero and the sequence proceeds to step 114.

In step 114, controller 70 implements a closed loop control of the EGR valve. Based on the various EGR variables monitored in step 102, controller 70 determines the approximate position that the EGR valve should be in using a look-up table. This value is then modified using the closed EGR stepper motor closed loop adjust variable determined above. Controller 70 then commands the EGR valve to open to the resulting modified value and the sequence repeats itself beginning with step 102.

The present invention thus achieves an improved and reliable EGR system using pressure-based feedback control by using open loop control during transient behavior and closed loop control for steady state accuracy. The EGR system performance of the present invention does not degrade over time or require minimum variability in existing EGR valve characteristics. Additionally, the present invention has low response time without the risk of going unstable, while providing hardware and software to more robustly measure the pressure drop across an orifice in the EGR flow stream From the foregoing, it can be seen that there has been brought to the art a new and improved EGR system using pressure-based feedback control. It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims:

What is claimed is:

1. A method of controlling an EGR valve in fluid communication with an intake and exhaust manifold of an internal combustion engine comprising:

determining an engine speed;

determining a pressure value within an EGR flow path;

generating a desired EGR mass value from a lookup table of values indexed by said engine speed and pressure value;

open-loop commanding said EGR valve to a position corresponding to said desired EGR mass value;

comparing said desired EGR mass value to a measured EGR mass value to generate an error value; and closed-loop modifying said EGR valve position as a function of said error value.

2. A method according to claim 1 wherein commanding said EGR valve comprises open-loop driving a stepper motor coupled to said EGR valve to a corresponding motor position.

3. A method according to claim 1 wherein comparing comprises determining whether said desired EGR mass value is less than said measured EGR value and, if so, generating an incremental error value.

4. A method according to claim 1 wherein comparing comprises determining whether said desired EGR mass value is greater than said measured EGR value and, if so, generating an decremental error value.

5. A method according to claim 1 wherein comparing comprises determining whether said desired EGR mass value is equal to said measured EGR value and, if so, setting said error value to zero.

6. A method according to claim 1 wherein said measured EGR mass value is inferred from a differential pressure value across a control orifice located within said EGR flow path.

7. A method according to claim 1 wherein modifying said EGR valve position comprises closed-loop driving a stepper motor coupled to said EGR valve to a corresponding motor position.

8. A method according to claim 1 wherein commanding said EGR valve comprises open-loop driving an electric motor coupled to said EGR valve by way of a rotary gear train assembly to a corresponding motor position.

9. An EGR system for an internal combustion engine comprising:

an EGR valve;

an actuator responsive to a control signal and coupled to said EGR valve for driving said EGR valve to a commanded valve position;

a position sensor coupled to said EGR valve for detecting a position of said EGR valve and generating a EGR position signal; and a controller coupled to said actuator and said position sensor, said controller receiving said position output signal and transmitting said control signal to said actuator for driving said EGR valve, said controller including control logic operative to receive an engine speed value and a pressure value within an EGR flow path, generate a desired EGR mass value from a lookup table of values indexed by said engine speed and pressure values, open-loop set said control signal as a function of said desired EGR mass value, compare said desired EGR mass value to a measured EGR mass value to generate an error value, and closed-loop modify said control signal as a function of said error value and said EGR position signal.

10. An EGR system according to claim 9 wherein said actuator is a permanent magnet DC commutator motor coupled to said EGR valve.

11. An EGR system according to claim 10 wherein said actuator is coupled to said ERG valve by way of a rotary gear train assembly.

12. An EGR system according to claim 9 wherein said control logic is operative to determine whether said desired EGR mass value is less than said measured EGR value and, if so, generate an incremental error value.

13. An EGR system according to claim 12 wherein said control logic is operative to determine whether said desired EGR mass value is greater than said measured EGR value and, if so, generate an decremental error value.

14. An EGR system according to claim 13 wherein said control logic is operative to determine whether said desired EGR mass value is equal to said measured EGR value and, if so, setting said error value to zero.

15. An EGR system according to claim 9 wherein said actuator is an electric motor coupled to said EGR valve by way of a rotary gear train assembly.

* * * * *